(12) United States Patent
Olesen et al.

(10) Patent No.: US 9,834,144 B2
(45) Date of Patent: Dec. 5, 2017

(54) VEHICLE HEAD-UP DISPLAY ARRANGEMENT

(71) Applicant: VOLVO CAR CORPORATION, Gothenburg (SE)

(72) Inventors: Anna Olesen, Fredriksberg (DK); Joakim Christoffersson, Malmo (SE); Claus Allan Christensen, Kopenhamn (DK)

(73) Assignee: Volvo Car Corporation, Gothenburg (SE)

( * ) Notice: Subject to any disclaimer, the term of this patent is extended or adjusted under 35 U.S.C. 154(b) by 78 days.

(21) Appl. No.: 14/168,324

(22) Filed: Jan. 30, 2014

(65) Prior Publication Data
US 2014/0218268 A1 Aug. 7, 2014

(30) Foreign Application Priority Data

Feb. 1, 2013 (EP) .................................... 13153589

(51) Int. Cl.
| | |
|---|---|
| *G09G 5/00* | (2006.01) |
| *B60Q 1/00* | (2006.01) |
| *B60R 1/00* | (2006.01) |
| *G02B 27/01* | (2006.01) |
| *G06K 9/00* | (2006.01) |
| *G08G 1/0962* | (2006.01) |

(52) U.S. Cl.
CPC ................ *B60R 1/005* (2013.01); *B60R 1/00* (2013.01); *G02B 27/01* (2013.01); *G06K 9/00818* (2013.01); *G06K 9/00845* (2013.01); *G08G 1/09623* (2013.01); *B60R 2300/308* (2013.01); *G02B 2027/014* (2013.01); *G02B 2027/0138* (2013.01); *G02B 2027/0187* (2013.01)

(58) Field of Classification Search
CPC ........... G06F 3/013; G06F 2203/04809; G06F 3/041; G02B 27/017; G02B 2027/0187; G02B 27/0093
See application file for complete search history.

(56) References Cited

U.S. PATENT DOCUMENTS

| | | |
|---|---|---|
| 7,605,773 B2 | 10/2009 | Janssen |
| 2003/0112132 A1 | 6/2003 | Trajkovic et al. |
| 2003/0169213 A1 | 9/2003 | Spero |

(Continued)

OTHER PUBLICATIONS

Extended European Search Report for EP 13153589.0, Completed by the European Patent Office on Jun. 3, 2013, 7 Pages.

(Continued)

*Primary Examiner* — Nan-Ying Yang
(74) *Attorney, Agent, or Firm* — Brooks Kushman P.C.

(57) ABSTRACT

A vehicle head-up display arrangement is provided that may include a projection unit, a vehicle driver eye position estimation unit and a detecting unit arranged to detect traffic signs and their location in relation to the vehicle, and a processing unit arranged to determine a content of the traffic signs. The processing unit is further arranged to determine relevance of content of the traffic signs. The projection unit is arranged to project light onto one or more areas of the windshield in line with the estimated eye position of the vehicle driver and traffic signs determined to have content not being relevant, such that these traffic signs, at least partially, are covered from the estimated eye position of the vehicle driver.

17 Claims, 3 Drawing Sheets

(56) References Cited

U.S. PATENT DOCUMENTS

| | | | |
|---|---|---|---|
| 2004/0178894 A1* | 9/2004 | Janssen | 340/435 |
| 2005/0047629 A1* | 3/2005 | Farrell et al. | 382/117 |
| 2005/0237323 A1* | 10/2005 | Shimamura | A63F 13/10 |
| | | | 345/419 |
| 2010/0052885 A1 | 3/2010 | Hanqvist | |
| 2010/0253541 A1* | 10/2010 | Seder et al. | 340/905 |
| 2011/0301813 A1* | 12/2011 | Sun | B62D 15/029 |
| | | | 701/41 |

OTHER PUBLICATIONS

Chinese Search Report for Chinese Application No. 201410035480.5, completed by the Chinese Patent Office, dated Apr. 13, 2017, one page.

Office Action for Chinese Application No. 201410035480.5, English translation attached to original, both completed by the Chinese Patent Office on Apr. 25, 2017, all together 15 pages.

* cited by examiner

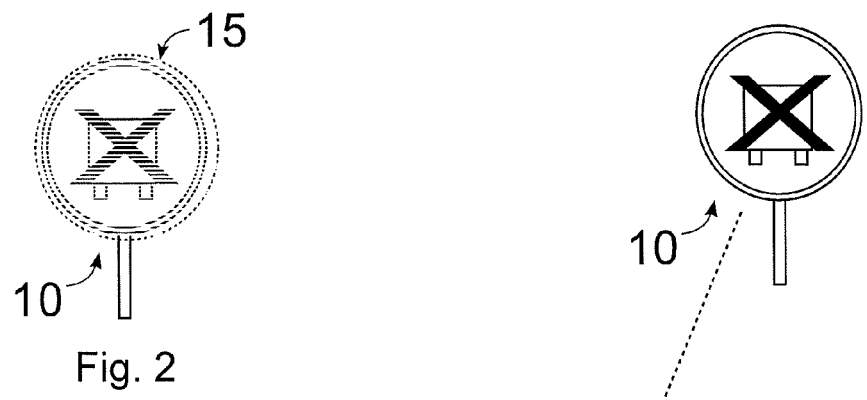
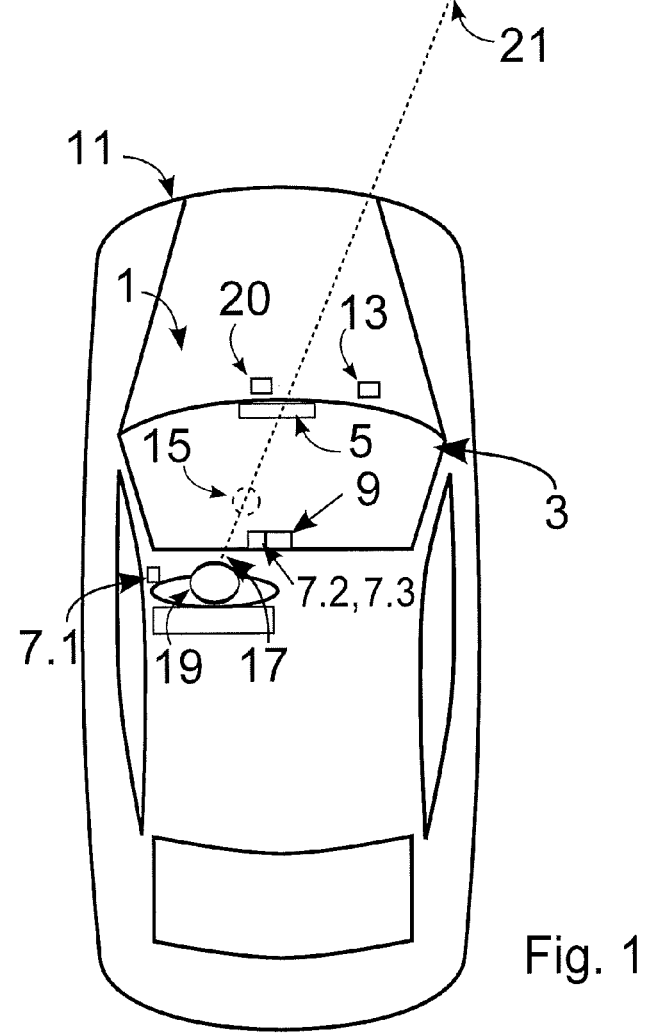

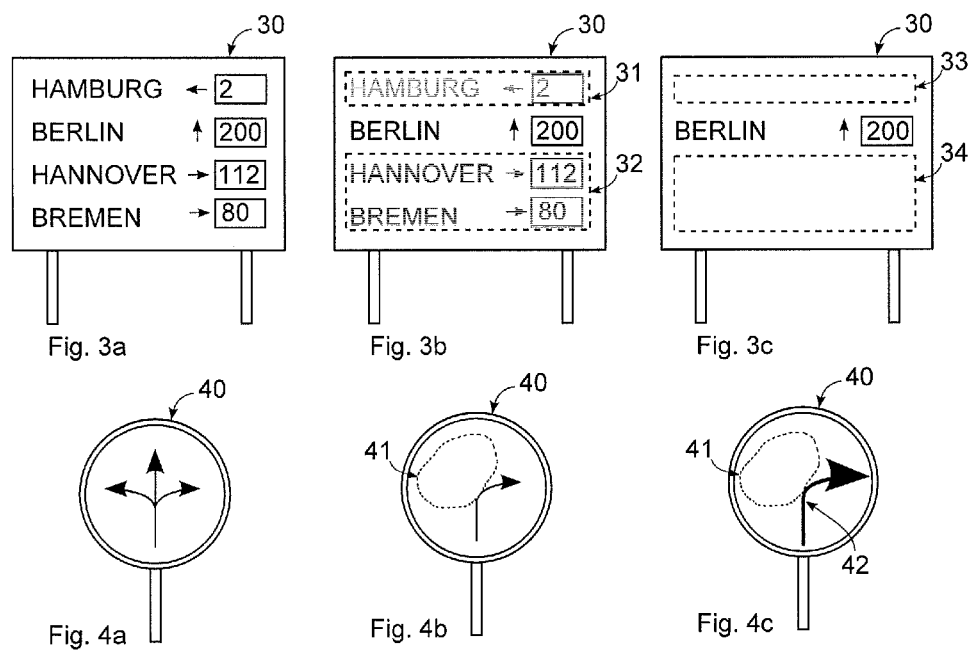

VEHICLE HEAD-UP DISPLAY ARRANGEMENT

CROSS-REFERENCE TO RELATED APPLICATIONS

This application claims foreign priority benefits under 35 U.S.C. §119(a)-(d) to European patent application number EP 13153589.0, filed Feb. 1, 2013, which is incorporated herein by reference in its entirety.

TECHNICAL FIELD

The present disclosure relates to a vehicle head-up display arrangement. The present disclosure also relates a vehicle comprising a vehicle head-up display arrangement and a method of projecting light onto a windshield of a vehicle.

BACKGROUND

A rapid technological development in the automotive industry together with an urbanisation process in most of the world's countries has resulted in that vehicle drivers are subjected to a lot of information, both from systems arranged in today's vehicles and from road signs, especially when driving in urban areas. Attempts have been made to provide arrangements assisting vehicle drivers in the process of handling information in a driving environment, for example by providing information that is easy to perceive or by marking information in the driving environment. An example of an arrangement marking information in a driving environment is described in the document U.S. Pat. No. 7,605,773 B2. The document describes a vehicle head-up display system comprising a projection unit. Given consideration to the vehicle driver head position the projection unit projects markings onto an area of the vehicle windshield such that these markings appears in a region of objects external to the vehicle when viewed from the driver head position. The head-up display system described is used to highlight objects such as animals, lane-markings and traffic signs. Even though the head-up display system described is capable of providing information that is easy to perceive, such system fails to satisfactorily assist vehicle drivers in the process of handling information in a driving environment. Thus, there is a need for an improved arrangement capable of assisting a vehicle driver in the process of handling information in a driving environment.

SUMMARY

An object of the present disclosure is to provide a head-up display arrangement capable of assisting a vehicle driver in the process of handling information in a driving environment.

According to an aspect of the disclosure, the object is achieved by a vehicle head-up display arrangement, comprising a vehicle windshield and a projection unit arranged to selectively project light onto the vehicle windshield, and a vehicle driver eye position estimation unit, and a detecting unit arranged to detect traffic signs in an environment external to the vehicle, hosting the arrangement, and their location in relation to the vehicle, and a processing unit arranged to determine a content of the traffic signs detected by the detecting unit, wherein the processing unit further is arranged to determine the relevance of the content of the traffic signs detected by the detecting unit, and in that the projection unit is arranged to project light onto one or more areas of the windshield in line with the estimated eye position of the vehicle driver and traffic signs determined to have a content not being relevant, such that these traffic signs, at least partially, are covered from the estimated eye position of the vehicle driver.

Since traffic signs determined to have a content not being relevant at least partially are covered from the estimated eye position of the vehicle driver, the vehicle driver is relieved from the amount of information the vehicle driver is subjected to in a driving environment. Thus, a head-up display arrangement is provided capable of assisting a vehicle driver in the process of handling information in the driving environment.

As a result, the above mentioned object is achieved.

Also, since the vehicle driver is assisted in the process of handling information in a driving environment, driving safety is improved.

According to some embodiments, the projection unit is further arranged to project light onto one or more areas of the windshield such that it at least partially will cover content determined not to be relevant from the estimated eye position of the vehicle driver. Also, the projection unit is arranged to project light onto one or more areas of the windshield such that it at least partially will cover content determined not to be relevant and leave content determined to be relevant un-covered from the estimated eye position of the vehicle driver. Thereby, when the detecting unit detects a traffic sign and the processing unit determines that the detected traffic sign comprises both content determined relevant and content determined not relevant, the projection unit will project light onto one or more areas of the windshield such that it at least partially will cover content of the traffic sign determined not to be relevant and leave content of the traffic sign determined to be relevant un-covered. Accordingly, in traffic signs comprising content both being relevant and not being relevant, as many traffic signs do, the covering of the not relevant content will assist the vehicle driver in finding the relevant content of traffic signs and relieve the vehicle driver from the irrelevant content. As a result, the head-up display arrangement is further improved.

According to some embodiments, the projection unit further is arranged to project light onto one or more areas of the windshield with an intensity such that it at least partially will provide an opaque cover of content determined not to be relevant from the estimated eye position of the vehicle driver. Since an opaque cover is provided of content determined not to be relevant from the estimated eye position of the vehicle driver, the vehicle driver is assisted in the process of handling information in a driving environment and at the same time able to perceive content determined not to be relevant. As a result, a failsafe for erroneous classification of relevance is provided through exposing the vehicle driver also to irrelevant content, although with reduced visibility.

According to some embodiments, the projection unit is arranged to project light onto one or more areas of the windshield such that content of traffic signs determined to be relevant is highlighted from the estimated eye position of the vehicle driver. In these embodiments, since content of traffic signs determined to be relevant are highlighted and at the same time, content determined not to be relevant are covered from the estimated eye position of the vehicle driver, the vehicle driver is further assisted in finding content determined to be relevant and thus also further assisted in the process of handling information in a driving environment. As a result, the head-up display arrangement is further improved.

According to some embodiments, the arrangement further comprises a vehicle navigation unit arranged to guide a vehicle driver to an inputted destination, and that the processing unit further is arranged to determine the relevance of the content of traffic signs with respect to the inputted destination. In such embodiments, since the processing unit is arranged to determine the relevance of the content of traffic signs with respect to the inputted destination, and the projection unit is arranged to project light onto one or more areas of the windshield in line with the estimated eye position of the vehicle driver and traffic signs determined to have a content not being relevant, such that these traffic signs, at least partially, are covered from the estimated eye position of the vehicle driver, the projected light will cover content of traffic signs not being relevant with respect to the inputted destination. Thereby, the vehicle driver is assisted in finding content of traffic signs being relevant with respect to the inputted destination and relieved from content of traffics signs not being relevant with respect to the inputted destination. As a result, the vehicle driver is further assisted in the process of handling information in a driving environment, and is given the opportunity to have an increased focus on important information in the driving environment. Thereby, the head-up display arrangement is further improved.

According to some embodiments, the vehicle driver eye position estimation unit comprises a head tracking camera. Since the vehicle driver eye position estimation unit comprises a head tracking camera, the eye position of the vehicle driver can be estimated with high accuracy. Thereby the projection unit is able to project light onto one or more areas of the windshield with high accuracy such that the light is projected onto one or more areas of the windshield being in line the eye position of the vehicle driver and traffic signs determined to have a content not being relevant. As a result, the head-up display arrangement is further improved.

According to some embodiments, the vehicle driver eye position estimation unit comprises an eye tracking camera. Since the vehicle driver eye position estimation unit comprises an eye tracking camera, the eye position of the vehicle driver can be estimated with high accuracy. Thereby the projection unit is able to project light onto one or more areas of the windshield with even higher accuracy such that the light is projected onto one or more areas of the windshield being in line the eye position of the vehicle driver and traffic signs determined to have a content not being relevant. As a result, the head-up display arrangement is further improved.

According to some embodiments, the projection unit is arranged to project light with a colour and intensity similar to the colour and intensity of the traffic signs determined to have a content not being relevant. In such embodiments, since the light is projected with a colour and intensity similar to the colour and intensity of the traffic signs, the covering of content determined to not be relevant will appear to blend in with the traffic sign from the estimated eye position of the vehicle driver. Thereby, the covering will not disturb the vehicle driver or divert the attention of the vehicle driver from information in the driving environment. As a result, the head-up display arrangement is further improved.

According to an aspect of the disclosure, the object is achieved by a method of projecting light onto a windshield of a vehicle using a vehicle head-up display arrangement comprising the vehicle windshield and a projection unit arranged to selectively project light onto the vehicle windshield, and a vehicle driver eye position estimation unit, and a detecting unit, and a processing unit, the method comprising;

estimating vehicle driver eye position, using the vehicle driver eye position estimation unit, and detecting traffic signs in an environment external to the vehicle, hosting the arrangement, and their location in relation to the vehicle, using the detecting unit, and determining a content of the traffic signs detected by the detecting unit, using the processing unit, and determining the relevance of the content of the traffic signs detected by the detecting unit, using the processing unit, and projecting light onto one or more areas of the windshield in line with the estimated eye position of the vehicle driver and traffic signs determined to have a content not being relevant, such that these traffic signs, at least partially, are covered from the estimated eye position of the vehicle driver, using the projection unit.

Again, since traffic signs determined to have content not being relevant at least partially are covered from the estimated eye position of the vehicle driver, the vehicle driver is relieved from the amount of information the vehicle driver is subjected to in a driving environment. Thus, a method of projecting light onto a windshield of a vehicle is provided capable of assisting a vehicle driver in the process of handling information in a driving environment.

As a result, the above mentioned object is achieved.

Also, since the vehicle driver is assisted in the process of handling information in a driving environment, the safety of driving is improved.

Further features of, and advantages with, the present disclosure will become apparent when studying the appended claims and the following detailed description. Those skilled in the art will realize that different features of the present disclosure may be combined to create embodiments other than those described in the following, without departing from the scope of the present disclosure, as defined by the appended claims.

BRIEF DESCRIPTION OF THE DRAWINGS

The various aspects of the disclosure, including its particular features and advantages, will be readily understood from the following detailed description and the accompanying drawings, in which:

FIG. 1 illustrates a vehicle head-up display arrangement 1 according to some embodiments, and FIG. 2 illustrates the traffic sign 10, illustrated in FIG. 1, being viewed from the estimated eye position 17 of the vehicle driver 19 through the windshield 3 of the vehicle 11 hosting the arrangement 1 according to some embodiments, and FIG. 3a illustrates a traffic sign 30 comprising the content of city names, direction arrows, and distance markers, and FIGS. 3b and 3c illustrates the traffic sign 30 being viewed from the vehicle driver eye position through the windshield of a vehicle comprising the arrangement 1 according to some embodiments, and FIG. 4a illustrates a traffic sign 40 comprising the content of direction arrows pointing towards different destinations in an upcoming junction, and FIGS. 4b and 4c illustrates the traffic sign 40 being viewed from the eye position of the vehicle driver through the windshield of a vehicle comprising the arrangement 1 according to some embodiments.

DETAILED DESCRIPTION

Figure 5:
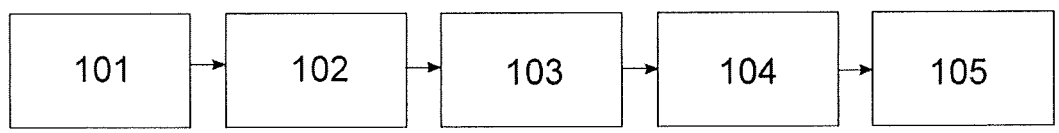
FIG. 5 illustrates a method of projecting light onto a windshield of a vehicle using a vehicle head-up display arrangement 1 according to some embodiments.

As required, detailed embodiments of the present disclosure are disclosed herein. However, it is to be understood that the disclosed embodiments are merely exemplary of the disclosure that may be embodied in various and alternative forms. The figures are not necessarily to scale. Some features may be exaggerated or minimized to show details of particular components. Therefore, specific structural and functional details disclosed herein are not to be interpreted as limiting, but merely as a representative basis for teaching one skilled in the art to variously employ the present disclosure.

The embodiments herein will now be described more fully with reference to the accompanying drawings, in which example embodiments are shown. Disclosed features of example embodiments may be combined as readily understood by one of ordinary skill in the art to which this disclosure belongs. Like numbers refer to like elements throughout. Well-known functions or constructions will not necessarily be described in detail for brevity and/or clarity.

FIG. 1 illustrates a vehicle head-up display arrangement 1 according to some embodiments, comprising a vehicle windshield 3 and a projection unit 5 arranged to selectively project light onto the vehicle windshield 3, and a vehicle driver eye position estimation unit 7.1, 7.2, 7.3 and a detecting unit 9 arranged to detect traffic signs 10 in an environment external to the vehicle 11, hosting the arrangement 1, and their location in relation to the vehicle 11, and a processing unit 13 arranged to determine a content of the traffic signs 10 detected by the detecting unit 9. The processing unit 13 is further arranged to determine the relevance of the content of the traffic signs 10 detected by the detecting unit 9. The projection unit 5 is arranged to project light onto one or more areas 15 of the windshield 3 in line with the estimated eye position 17 of the vehicle driver 19 and the traffic sign 10 determined to have a content not being relevant, such that the traffic sign 10, at least partially, are covered from the estimated eye position 17 of the vehicle driver 19.

The projection unit 5 may comprise a cathode ray tube, and/or a light-emitting diode, and/or a laser, and/or a liquid crystal display, and/or a convex lens or a concave mirror, and/or any other means for selectively projecting light onto the vehicle windshield 3. The projection unit 5 is arranged to selectively project light onto a large proportion of the vehicle windshield 3.

The vehicle windshield 3 is arranged to reflect light projected by the projection unit 5 at least towards the estimated eye position 17 of the vehicle driver 19. The vehicle windshield 3 may be provided with a coating for the purpose of reflecting the light. The coating may be fluorescent such that adsorbed light is emitted to light having a different wavelength than the adsorbed light.

The vehicle driver eye position estimation unit may comprise a vehicle driver seat position estimation unit 7.1. As an alternative or in combination, the vehicle driver eye position estimation unit comprises a head tracking camera 7.2 and/or an eye tracking camera 7.3.

The detecting unit 9 may be arranged in an area near the vehicle rear view mirror, as illustrated in FIG. 1 and/or in a region in front of the vehicle 11 such that it covers the environment external to the vehicle 11 in a direction coinciding with an intended direction of forward travel such that it can detect traffic signs 10 in the environment external to the vehicle 11 in a direction of an intended direction of forward travel, and the location of the traffic signs 10 in relation to the vehicle 11. The location may be defined as two angles to the traffic sign 10 with respect to the vehicle 11, with possible addition of a distance to the traffic sign 10. As an alternative or in combination, the location may be defined as a position of the traffic sign 10 in relation to the vehicle 11. The detecting unit 9 may comprise a camera unit. The camera unit may be a camera unit capable of capturing an image of visible light and/or a camera unit capable of capturing an image of invisible light, such as an infrared camera. The detecting unit 9 may further comprise RADAR (RAdio Detection And Ranging) system and/or a SONAR (SOund Navigation and Ranging) system and/or an ultra sound system and/or a LIDAR (Light Detecting And Ranging) system.

The processing unit 13 may comprise one or more processors and one or more memory units in communication with the one or more processors and associated software, such that it, as the associated software is executed by the one or more processors, can determine content of traffic signs 10 and the relevance of the content of the traffic signs 10 detected by the detecting unit 9. The one or more memory units may comprise data representative of content of traffic signs 10 being classified in a way such that the processing unit 13 can compare determined content of traffic signs 10 detected by the detecting unit 9 with data to thereby determine relevance of the content of the traffic signs 10 detected. The relevance of a traffic sign 10 detected may for example be determined with regard to data of the vehicle 11 hosting the head-up display arrangement 1, and/or data of a current vehicle driver 19, for example personal preferences, age, sex, driving style, and/or with regard to an estimated and/or inputted destination in a navigation system 20, as explained further below.

In FIG. 1, an example embodiment is illustrated, wherein a vehicle comprising a vehicle head-up display arrangement 1 according some embodiments is illustrated as approaching a traffic sign 10 comprising a content showing a ban on heavy vehicles of a particular stretch of the road. Here, the vehicle 11 is illustrated as an automobile not belonging to the category of heavy vehicles. As indicated above, according to some embodiments, relevance of traffic signs detected may for example be determined with regard to data of the vehicle 11 hosting the head-up display arrangement 1. In the embodiment shown in FIG. 1 the one or more memory units of the processing unit 13 comprises data of the current vehicle 11 being such that when a content of a traffic sign as illustrated in FIG. 1 is detected and compared with the data, the content is determined to be not relevant. The projection unit 5 is therefore projecting light onto an area 15 of the windshield 3 in line with the estimated eye position 17 of the vehicle driver 19 and the traffic sign 10, such that the traffic sign 10, at least partially, are covered from the estimated eye position 17 of the vehicle driver 19.

In FIG. 1, a dashed line 21 is illustrated between the estimated eye position 17 of the vehicle driver 19 and the traffic sign 10. Also, as seen in in FIG. 1, the projection unit 5 projects light onto an area 15 of the windshield 3 in the dotted line 21. Thereby, the light projected onto the area 15, which is reflected on the windshield 3 towards the estimated eye position 17 of the vehicle driver 19, will give the vehicle driver 19 the impression that the light covers the traffic sign 10. The projection of the light onto an area of the windshield 3 may be adjusted for a refractive index of the windshield 3.

FIG. 2 illustrates the traffic sign 10, illustrated in FIG. 1, being viewed from the estimated eye position 17 of the vehicle driver 19 through the windshield 3 of the vehicle 11 hosting the arrangement 1. Here, the light is projected onto the area 15 of the windshield 3 with an intensity such that it will provide an opaque cover of content of the traffic sign 10. Thereby the vehicle driver 19 is able to perceive the content of the traffic sign 10, even if it is determined to be not relevant.

Also, in the embodiments described, the one or more areas of the windshield 3 may be moveable areas such that when the vehicle, hosting the arrangement 1, is traveling along a route, the covering of traffic signs will follow the sign from the estimated eye position of the vehicle driver. For example, in the arrangement 1 illustrated in FIG. 1, the area 15 onto which the projection unit 5 projects light will move in a direction to the right in the figure with an increasing rate when the vehicle moves in a forward direction. Likewise, if a vehicle hosting the arrangement 1 is travelling along a curved section of a road the area will be moved such that the light projected, from the estimated eye position 17 of the vehicle driver 19, gives the impression of covering of a traffic sign determined to have a content not being relevant. This may be achieved by the detecting unit 9 constantly updating the location of traffic signs detected in relation to the vehicle 11 whereby the projection unit 5 uses the updated location to project the light onto an area of the windshield.

According to some embodiments, the arrangement 1 further comprises a vehicle navigation unit 20 arranged to guide a vehicle driver 19 to an inputted destination, and that the processing unit 13 further is arranged to determine the relevance of the content of traffic signs with respect to the inputted destination. The vehicle navigation unit 20 comprises an input unit via which a vehicle occupant can input a desired destination. Further, the vehicle navigation unit 20 may comprise an electronic map and a positioning device such as a spaced based satellite navigation system such as a Global Positioning System (GPS), The Russian GLObal NAvigation Satellite System (GLONASS), European Union Galileo positioning system, Chinese Compass navigation system, or Indian Regional Navigational Satellite System. The determination of the relevance of the content of traffic signs with respect to the inputted destination may be made such that content showing directions and/or routes not belonging to a direction or route heading towards the inputted destination is determined to be not relevant.

FIG. 3a-3c illustrates a traffic sign 30 comprising the content of city names, direction arrows, and distance markers. The illustrated example traffic sign 30 shows the amount of information a vehicle driver can be subjected to, even from a single traffic sign. In all the FIGS. 3a-3c, the traffic sign 30 is illustrated as being viewed from an eye position of the vehicle driver 19 through a vehicle windshield 3. In FIG. 3a, the traffic sign is illustrated as being viewed from the vehicle driver eye position through the windshield of a vehicle not comprising the arrangement 1 described herein. In FIGS. 3b and 3c, the traffic sign 30 is illustrated as being viewed from the vehicle driver eye position 17 through the windshield 3 of a vehicle 11 comprising the arrangement 1 according to some embodiments. In these embodiments, the destination Berlin has been inputted to the navigation unit 20. As can be seen in these figures, the processing unit 13 determines that other content such as city names, direction arrows and distance markers of the traffic sign 30 not are relevant with respect to the inputted destination why this content is covered from the estimated eye position 17 of the vehicle driver 19. In FIG. 3b, an opaque cover of content is illustrated and in FIG. 3c, a full cover of content is illustrated. In both these embodiments, the projection unit 5 may be arranged to project light with a colour and intensity similar to the colour and intensity of the traffic sign 30. Thereby, the covering may be made such that it blends in with the colour and intensity of the traffic sign 30.

Also, as can be seen in FIGS. 3b and 3c, the projection unit 5 has projected light onto two areas of the windshield 3, areas 31 and 32 in FIG. 3b and areas 33 and 34 in FIG. 3c, such that it at least partially covers content determined not to be relevant from the estimated eye position 17 of the vehicle driver 19. Also, as seen in these figures, the content determined to be relevant i.e. the city name Berlin, the direction arrow pointing towards the destination and the distance marker to the destination is left un-covered. Thus, according to such embodiments, when a traffic sign is detected comprising content both being determined to be relevant and not being relevant, the arrangement 1 will only cover the not relevant content from the estimated vehicle driver eye position. As a result, the vehicle driver 19 is able to quickly perceive the relevant content of the traffic sign 30. Accordingly, the vehicle driver 19 is assisted in the process of handling information in a driving environment, and is given the opportunity to focus on other information in the driving environment than the not relevant content of the traffic sign 30.

FIG. 4a-4c illustrates a traffic sign 40 comprising the content of direction arrows pointing towards different destinations in an upcoming junction. In all the FIGS. 4a-4c, the traffic sign 40 is illustrated as being viewed from a vehicle driver 19 eye position through a vehicle windshield 3. In FIG. 4a, the traffic sign is illustrated as being viewed from the vehicle driver eye position through the windshield of a vehicle not comprising the arrangement 1 described herein. In FIGS. 4b and 4c, the traffic sign 40 is illustrated as being viewed from the eye position 17 of the vehicle driver 19 through the windshield 3 of a vehicle comprising the arrangement 1 according to some embodiments. In the embodiments illustrated in FIGS. 4b and 4c, a destination has been inputted to the navigation unit 20 to which the direction arrow pointing in a right direction of the traffic sign 40 illustrated in FIG. 4a-4c points towards. Here, light is projected onto the area 41 of the windscreen such that the other direction arrows of the traffic sign 40 not pointing towards the inputted destination is covered from the estimated eye position 17 of the vehicle driver 19. In FIG. 4c, an embodiment is illustrated where the projection unit 5 projects light onto an area 42 of the windshield 3 such that the content of the traffic sign 40 determined to be relevant is highlighted from the estimated eye position 17 of the vehicle driver 19. The highlighting may be provided in form of a gain or amplification of the relevant content from the estimated vehicle eye position which may apply to both symbols, such that the arrow illustrated in FIG. 4c, and to written text. As an alternative or in combination, the highlighting of content determined to be relevant may be provided in form of a ring surrounding the relevant content. The gain or amplification of the relevant content and/or the ring surrounding the relevant content may be provided in a colour being different from the colour of the traffic sign comprising the content. Thereby, the vehicle driver 19 may be able to easily perceive the relevant content. Such colour may for example be the colour red.

FIG. 5 illustrates a method of projecting light onto a windshield of a vehicle using a vehicle head-up display arrangement comprising the vehicle windshield and a projection unit arranged to selectively project light onto the vehicle windshield, and a vehicle driver eye position estimation unit, and a detecting unit, and a processing unit, the method comprising;

estimating 101 vehicle driver eye position, using the vehicle driver eye position estimation unit, and detecting 102 traffic signs in an environment external to the vehicle, hosting the arrangement, and their location in relation to the vehicle, using the detecting unit, and determining 103 a content of the traffic signs detected by the detecting unit, using the processing unit, and determining 104 the relevance of the content of the traffic signs detected by the detecting unit, using the processing unit, and projecting 105 light onto one or more areas of the windshield in line with the estimated eye position of the vehicle driver and traffic signs determined to have a content not being relevant, such that these traffic signs, at least partially, are covered from the estimated eye position of the vehicle driver, using the projection unit.

Since traffic signs determined to have content not being relevant at least partially are covered from the estimated eye position of the vehicle driver, a method of projecting light onto a windshield of a vehicle is provided capable of assisting a vehicle driver in the process of handling information in a driving environment.

It is to be understood that the foregoing is illustrative of various example embodiments and the disclosure is not to be limited to the specific embodiments disclosed and that modifications to the disclosed embodiments, combinations of features of disclosed embodiments as well as other embodiments are intended to be included within the scope of the appended claims. It is further to be understood that the words used in the specification are words of description rather than limitation, and that various changes may be made without departing from the spirit of the disclosure. Additionally, the features of various implementing embodiments may be combined to form further embodiments of the disclosure.

What is claimed is:

1. A vehicle head-up display arrangement comprising:
a vehicle windshield and a projection unit arranged to selectively project light onto the vehicle windshield;
a vehicle driver eye position estimation unit for estimating eye position of a vehicle driver;
a detecting unit arranged to detect traffic signs in an environment external to a vehicle hosting the arrangement, and to detect locations of the traffic signs in relation to the vehicle; and
a processing unit arranged to determine content of the traffic signs detected by the detecting unit;
wherein the processing unit further is arranged to determine relevance of the content of the traffic signs detected by the detecting unit, and the projection unit is arranged to project light onto one or more areas of the windshield in line with the estimated eye position of the vehicle driver such that traffic signs detected in the environment external to the hosting vehicle determined to have content not relevant are at least partially covered by the projection unit on the windshield by blocking the not relevant content of the detected traffic signs from the estimated eye position of the vehicle driver without projecting an expanded view of an area from a field of vision of the driver.

2. The arrangement according to claim 1 wherein the projection unit further is arranged to project light onto one or more areas of the windshield with an intensity such that it at least partially will provide an opaque cover of content determined not to be relevant from the estimated eye position of the vehicle driver.

3. The arrangement according to claim 1 wherein the projection unit is arranged to project light onto one or more areas of the windshield such that content of traffic signs determined to be relevant is highlighted from the estimated eye position of the vehicle driver.

4. The arrangement according to claim 1 wherein the arrangement further comprises a vehicle navigation unit arranged to guide a vehicle driver to a destination, and that the processing unit further is arranged to determine the relevance of the content of traffic signs with respect to the destination.

5. The arrangement according to claim 1 wherein the vehicle driver eye position estimation unit comprises a head tracking camera.

6. The arrangement according to claim 1 wherein the vehicle driver eye position estimation unit comprises an eye tracking camera.

7. The arrangement according to claim 1 wherein the projection unit is arranged to project light with a color and intensity similar to a color and intensity of the traffic signs determined to have a content not being relevant.

8. A vehicle comprising a vehicle head-up display arrangement according to claim 1.

9. A method of projecting light onto a windshield of a vehicle using a vehicle head-up display arrangement, the method comprising:
estimating eye position of a vehicle driver, using a vehicle driver eye position estimation unit;
detecting traffic signs in an environment external to a vehicle hosting the arrangement, and detecting locations of the traffic signs in relation to the vehicle, using a detecting unit;
determining content of the traffic signs detected by the detecting unit, using a processing unit;
determining relevance of the content of the traffic signs detected by the detecting unit, using the processing unit, and
projecting light onto one or more areas of the windshield in line with the estimated eye position of the vehicle driver such that traffic signs detected in the environment external to the hosting vehicle determined to have content not relevant are at least partially covered from the estimated eye position of the vehicle driver, using a projection unit arranged to selectively project light onto the vehicle windshield to block on the windshield the not relevant content of the detected traffic signs without projecting an expanded view of an area from a field of vision of the driver.

10. A vehicle head-up display arrangement comprising:
a projection unit arranged to selectively project light onto a vehicle windshield;
a vehicle driver eye position estimation unit for estimating eye position of a vehicle driver;
a detecting unit arranged to detect traffic signs in an environment external to a vehicle hosting the arrangement; and
a processing unit arranged to determine content of the traffic signs detected by the detecting unit;
wherein the processing unit is further arranged to determine a relevance of the content of the traffic signs detected by the detecting unit and to control the projection unit to project light onto one or more areas of the windshield in line with the estimated eye position of the vehicle driver such that traffic signs detected in the environment external to the hosting vehicle determined to have content not relevant are at least partially covered by the projection unit on the windshield by blocking the not relevant content of the detected traffic signs from the estimated eye position of the vehicle driver without projecting an expanded view of an area from a field of vision of the driver.

11. The arrangement according to claim 10 wherein the control unit is further arranged to control the projection unit to project light onto one or more areas of the windshield with an intensity to at least partially provide an opaque cover of content determined not to be relevant from the estimated eye position of the vehicle driver.

12. The arrangement according to claim 10 wherein control unit is further arranged to control the projection unit to project light onto one or more areas of the windshield such that content of traffic signs determined to be relevant is highlighted from the estimated eye position of the vehicle driver.

13. The arrangement according to claim 10 wherein the arrangement further comprises a vehicle navigation unit arranged to guide a vehicle driver to a destination, and the processing unit is further arranged to determine the relevance of the content of traffic signs with respect to the destination.

14. The arrangement according to claim 10 wherein the vehicle driver eye position estimation unit comprises a head tracking camera.

15. The arrangement according to claim 10 wherein the vehicle driver eye position estimation unit comprises an eye tracking camera.

16. The arrangement according to claim 10 wherein the control unit is further arranged to control the projection unit to project light with a color and intensity similar to a color and intensity of the traffic signs determined to have not relevant content.

17. A vehicle comprising a vehicle head-up display arrangement according to claim 10.

* * * * *

UNITED STATES PATENT AND TRADEMARK OFFICE
CERTIFICATE OF CORRECTION

PATENT NO. : 9,834,144 B2
APPLICATION NO. : 14/168324
DATED : December 5, 2017
INVENTOR(S) : Anna Olesen et al.

Page 1 of 1

It is certified that error appears in the above-identified patent and that said Letters Patent is hereby corrected as shown below:

In the Claims

Column 11, Line 6, Claim 11:
Delete "control unit"
Insert -- processing unit --

Column 11, Line 12, Claim 12:
Delete "control unit"
Insert -- the processing unit --

Column 11, Line 12, Claim 16:
Delete "control unit"
Insert -- processing unit --

Signed and Sealed this
First Day of May, 2018

Andrei Iancu
*Director of the United States Patent and Trademark Office*